Oct. 3, 1961     J. S. EDISON     3,002,465
HIGH PRESSURE PUMP
Filed Aug. 13, 1959     2 Sheets-Sheet 1
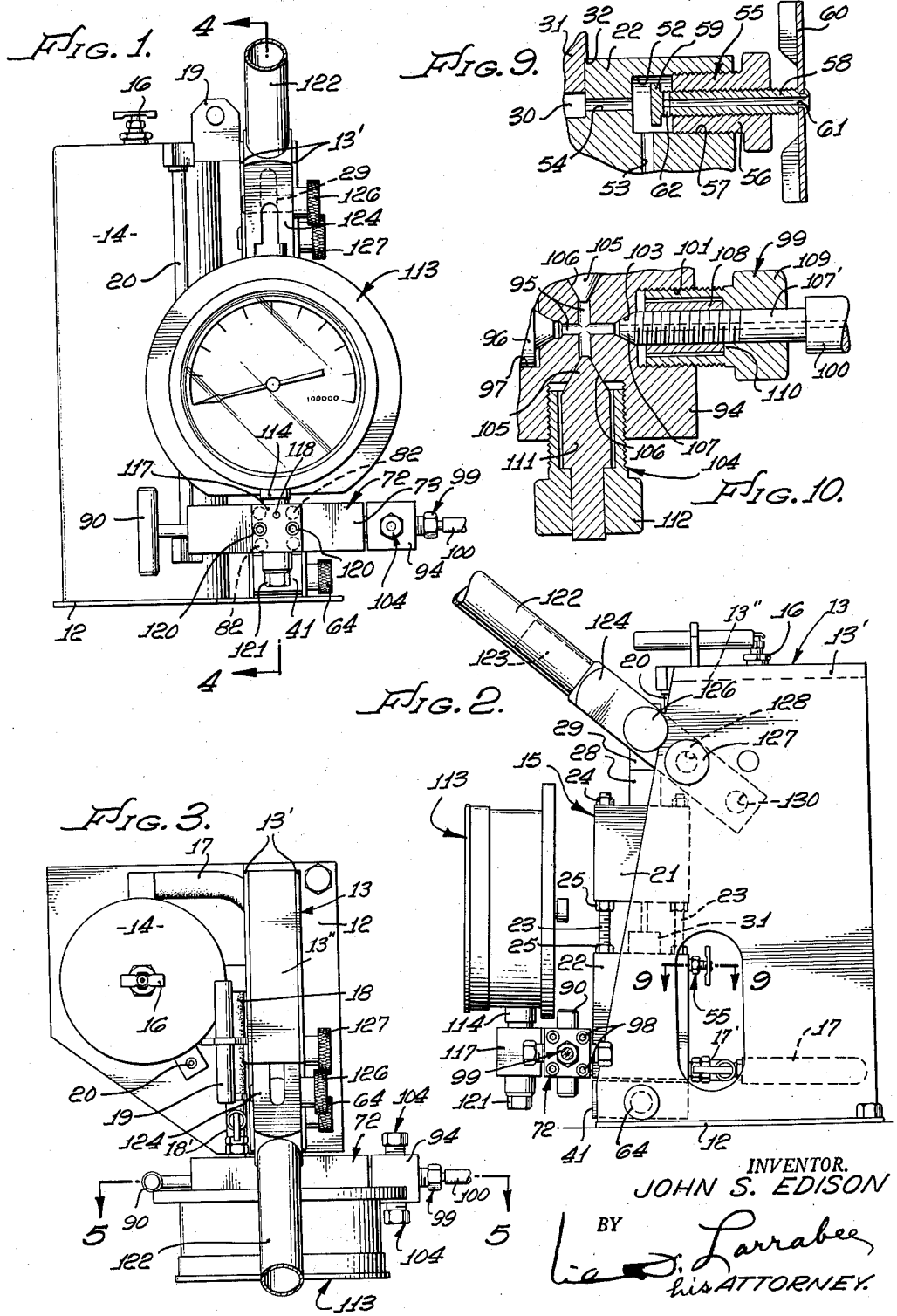
INVENTOR.
JOHN S. EDISON
BY
his ATTORNEY.

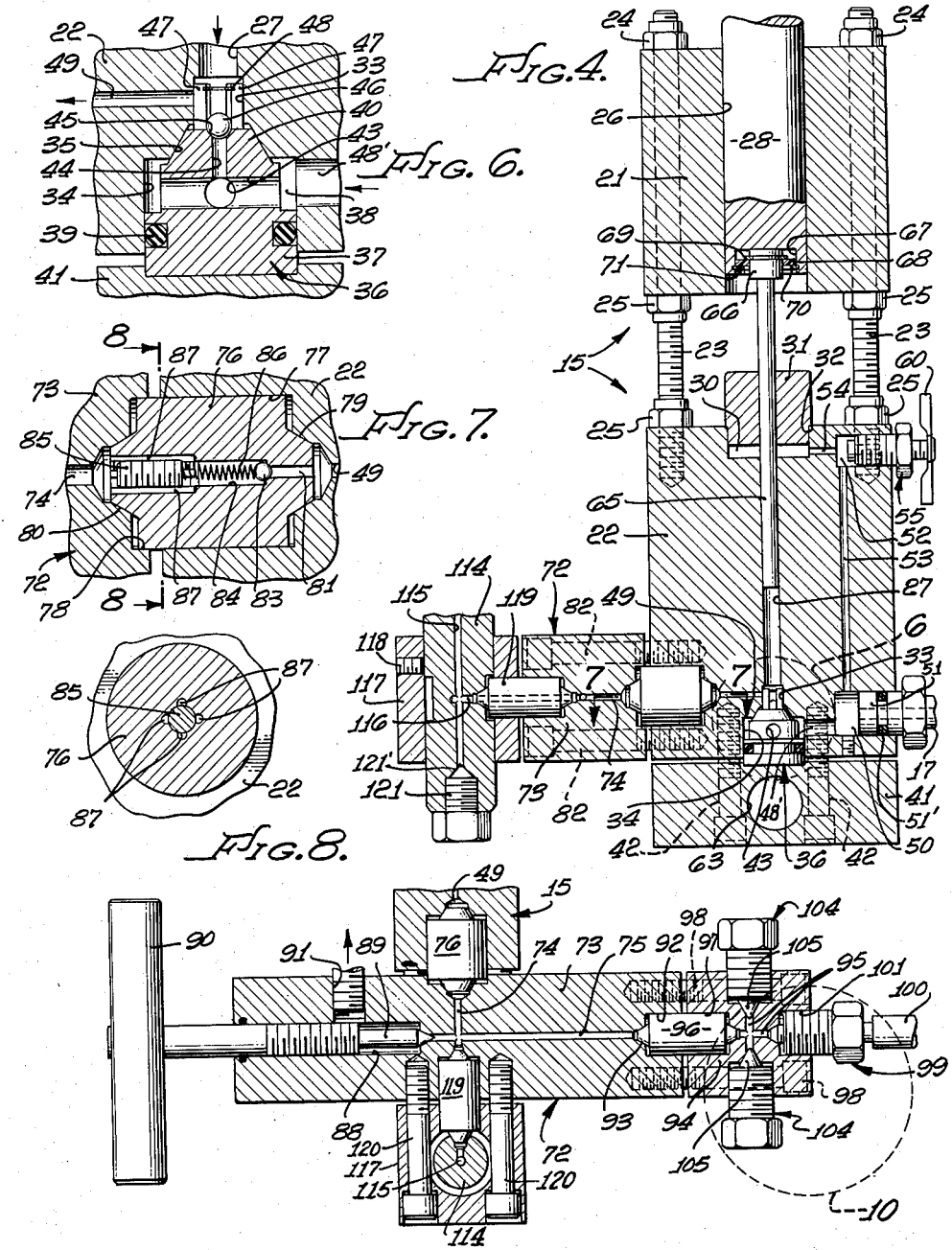

United States Patent Office 3,002,465
Patented Oct. 3, 1961

3,002,465
HIGH PRESSURE PUMP
John S. Edison, 1434 Broadway, Burbank, Calif.
Filed Aug. 13, 1959, Ser. No. 833,492
7 Claims. (Cl. 103—153)

My invention relates to a device for providing very high hydraulic pressures, such as required to test very high pressure hydraulic systems and components thereof, the pressures amounting to as much as a hundred thousand pounds per sq. inch.

Such very high pressures have not previously been obtainable to the best of my knowledge, without the use of large and cumbersome equipment, and which is very expensive to manufacture and maintain.

One difficulty with very high pressure hydraulic apparatus is that it is very difficult to provide effective pressure sealing means since the high pressures rapidly destroy sealing rings and packings which are adequate at lower pressures.

Another drawback to high pressure equipment of known types is that sudden release of pressure, such as the bursting of high pressure hose, releases great power and may cause serious damage to equipment and injury to personnel.

Because of the difficulty and expense of using very high pressure hydraulic equipment for testing high pressure equipment, it has been quite usual to carry out tests at lower pressures and try to obtain results which would enable the behavior of the part to be forecast at the much higher pressure levels at which it was required to operate.

The heretofore unwieldy very large high pressure hydraulic equipment for testing purposes also rendered testing of parts in place and in the field difficult to effect.

Forecasting the behavior of a part under much higher pressures than those at which it was actually tested is at least very unsatisfactory.

It is also unsatisfactory to rely on a part found satisfactory before some apparently immaterial work was done on it which however may have had considerable effect on the ability of the part to resist pressure.

It is an object of my invention to provide a device of light weight and small size which may be readily used wherever high hydraulic pressures are required for testing or temporary operation of hydraulic system components.

A further object of my invention is to provide a novel device which is safe in use and cannot cause damage in the event of sudden failure of the part or component being subjected to high pressure.

Another object of my invention is to provide a novel device by which very high hydraulic pressures may be produced that although comprising a number of separately fabricated parts for ease of manufacture is nevertheless assembled without the use of separate seals to function without any leakage.

Other objects, advantages and features of invention may appear from the accompanying drawings, the subjoined detail description, and the appended claims.

The accompanying drawings illustrate the invention in a form I at present deem preferable.

FIGURE 1 is a front elevational view of the apparatus of my novel invention.

FIG. 2 is a side elevational view of the apparatus shown in FIG. 1.

FIG. 3 is a top plan view of the same.

FIG. 4 is a fragmentary section on line 4—4, FIG. 1 drawn on a larger scale.

FIG. 5 is an enlarged fragmentary section on line 5—5, FIG. 3.

FIG. 6 is a fragmentary section showing the parts in the dotted circle 6 in FIG. 4, and drawn on a further enlarged scale.

FIG. 7 is a fragmentary section on line 7—7, FIG. 4, and drawn on an enlarged scale.

FIG. 8 is a fragmentary section on line 8—8, FIG. 7.

FIG. 9 is a fragmentary detail, in section, and taken on line 9—9, FIG. 2, but rotated 90°, and drawn on a larger scale.

FIG. 10 is a fragmentary sectional view, on an enlarged scale, of the parts shown in the dotted circle 10 in FIG. 5.

Referring now to FIGS. 1, 2 and 3, the pressurizing device of my invention comprises a base 12 on which is mounted an inverted, U-shaped mounting member 13 comprising spaced, identical side plates 13', 13' having their lower ends secured to said base and a top member 13" welded to the upper ends of said plates, the component units of the device being carried on said base and mounting member.

The components comprise a hydraulic fluid reservoir 14, mounted vertically on the base 12, and an oscillating pump structure generally indicated at 15, and including header, plunger, piston, cylinder, valves, and pressure gauge, pivotally mounted on the mounting member 13. An operating lever is detachably pivotally fulcrumed in the mounting member 13 and pivotally connected to the pump structure.

The reservoir 14 is fitted with a top filling connection 16, a flexible hose outlet connector 17 and a flexible hose return 18 said flexible hoses accommodating the oscillation of the pump structure. A hand hold member 19 is welded between the top of the reservoir and the mounting member. A liquid level gauge tube 20 is mounted on the reservoir. The floating pump structure generally indicated at 15 in FIG. 2 is best shown in FIG. 2 and comprises an upper or header block 21 and a lower or cylinder block 22 rigidly though demountably connected together by studs 23 secured in the cylinder block and passing through holes drilled through the header. Nuts 24 and lock nuts 25 on the studs are adjusted to hold bores in the header and cylinder blocks exactly co-axial.

The bore 26 in the header block 21 is of much larger diameter than the co-axial bore or passage 27 drilled through the cylinder block 22. A plunger 28 is positioned in bore 26 and is an easy sliding fit therein. The upper end of plunger 28 is flattened as shown at 29 (FIG. 1) and is drilled with a transverse hole for connection to operating means later described.

A co-axial recess 30 is provided at the upper end of bore 27. A guide block 31 is press fitted into the recess, a peripheral shoulder 32 limiting penetration of the guide block into the recess 30.

The lower end of bore 27 is counterbored at 33 and the counterbore opens into a co-axial recess 34 of larger diameter, spaced therefrom by an interposed, downwardly diverging frusto-conical seat 35 connecting the wall of the counterbore 33 and of the recess 34.

The lower end of the recess is closed by a plug generally indicated at 36 and shown in detail in FIG. 6. The plug 36 is provided with a lower portion 37 having a diameter closely fitting in recess 34 and an upper portion of lesser diameter leaving a peripheral passage 38 between the upper cylindrical portion of the plug and wall of the recess.

An oil tight seal between the lower edge of the passage 38 and lower surface of the cylinder block is formed by an O-ring seal 39. A conical upper end 40 of the plug 36 fits against the frusto-conical seat 35 and is clamped into engagement therewith by a bottom plate 41 drawn up against the bottom of plug 36 by screws 42.

The reduced diameter portion of plug 36 is drilled with intersecting transverse passages 43 communicating with a central vertical small bore 44 having a spherical seat 45 at its upper end for a ball check valve 46 guided for vertical movement by radially spaced vertical prongs 47 formed integrally with the plug and disposed in the counterbore 33; said ball being limited in its upward movement by a coaxially disposed spring wire ring 48 seated in notches in the inner edges of the prongs 47.

An inlet passage 48' for hydraulic fluid received from the reservoir 14 through outlet hose 17 and shutoff valve 17' communicates with the peripheral passage 38 and one end of an outlet passage 49 for hydraulic fluid communicates with the counterbore 33 at the lower end of bore 27 and above the ball check valve 46.

Inlet passage 48' communicates with a lateral recess 50 into which is inserted a fitting 51 carrying an O-ring 51' sealing the recess 50; said fitting being connected at its other end to valve 17'. A similar fitting extending parallel to the fitting 51 is interposed between the cylinder block 22 and the valve 18' to which the outlet hose 17 from reservoir 14 is connected.

A second lateral recess 52 is provided toward the upper end of the cylinder block 22 and vertically above recess 50, a vent passage 53 being drilled connecting recesses 50 and 52, and a further passage 54 connecting recess 52 with the space between the lower end of guide block 31 and the bottom of recess 30.

A vent valve generally indicated at 55 and most clearly shown in FIG. 9 is positioned in recess 52. The valve 55 comprises a bored plug 56 screw threaded on its exterior surface to engage the screw threaded portion 57 of the wall of recess 52. As will be later described, this permits purging the pump cylinder of any air before it is initially put into operation.

The bore of the plug 56 is also screw threaded to engage a screw threaded stem 58 which is provided with an enlarged head 59 located in recess 52, and at its outer end is peened over a central opening in a thumb piece 60 by which the head 59 may be drawn flush against the inner end of plug 56 or spaced therefrom. An axial passage 61 is drilled from the outer end of the screw threaded stem to a point behind the enlarged head 59. Lateral passages 62 are drilled into the axial passage 61 from behind the enlarged head 59.

The bottom plate 41 is provided with a transverse bore 63 by which the whole pump assembly is pivotally mounted on a removable pivot pin 64 (FIG. 1) passed through aligned holes in the side plates of mounting member 13 adjacent the base thereof.

The passage 27 drilled in block 22 constitutes the pump cylinder and hydraulic fluid is pressurized therein by a piston member 65 (FIG. 4) connected to plunger 28 by means of a head 66 abutting the inner face of a recess 67 formed in the lower face of plunger 28. Head 66 is held in operative position by a washer or diaphragm 68 for instance made from sheet steel in the form of a washer the outer edge of which fits loosely into the recess 67 while the inner edge fits on the side wall of head 66. The diaphragm is held between a split or bowed retaining ring 69 resting against the upper surface of the diaphragm and sprung into a groove in the head 66 above the diaphragm 68 and a second split ring 70 bearing against the lower surface of the diaphragm and sprung into a groove 71 in the wall of the recess 67.

The pressurized hydraulic fluid is delivered from the pump structure 15 to a distribtuor member generally indicated at 72 (see FIGS. 4 and 5) in the form of a rectangular block 73 of roughly square cross section but of a greater length than its cross section.

Member 72 is drilled with a passage 74 adapted to be aligned with passage 49 in the cylinder block 22 and with an axial passage 75 intersecting passage 74.

A recess or seat for a connecting member 76 is provided by axially aligned counterbores 77 and 78 at the meeting ends of passages 49 and 74. The diameter of counter bores 77 and 78 are much greater than that of the passages 49 and 74 and the bottom surfaces thereof are provided, respectively, with frusto-conical seats 79 and 80 for engagement by the mating conical ends of the connecting member 76. The connecting member 76 is provided with a valve controlled axial passage 81 aligned with and interconnecting passages 49 and 74 when member 72 is clamped against cylinder block 22 by screws 82.

The valve means controlling flow of fluid through connecting member 76 is shown in FIG. 7 and comprises a ball check valve 83 seated on the shoulder provided around the opening of passage 81 into an enlarged diameter length 84 of the passage. A portion of the enlarged diameter length of the passage is screw threaded and a screw stud 85 is positioned therein, the inner end of the screw stud providing an abutment for a small coil spring 86 under compression between the stud 85 and the ball check 83. Fluid is carried past the screw stud by longitudinal channels 87 (FIG. 8) interrupting the screw threads of the increased diameter portion of passage 81.

The transverse passage 75 at one end, the left in FIG. 5, is counterbored at 88 and screw threaded to receive the screw threaded stem of a needle valve 89. The point of the needle valve enters the left end of passage 75 and closes it when the valve is screwed in by turning handle 90.

An outlet port 91 connects with the counterbore 88 and is connected to the return conduit or hose 18 connected to the reservoir 14 through the interposed shutoff valve 18'.

As shown in FIG. 5, the right hand of passage 75 is counterbored at 92, a frusto-conical seat 93 being provided connecting the bore of the passage and of the counterbore.

A distributor head 94 is drilled with intersecting passages 95 normal to each other, one of which is in axial alignment with passage 75 in member 72 and is connected thereto by an interposed connector 96, one end of which fits into the counterbore 92 and is formed with a conical end fitting against seat 93. A counterbore 97 of one of the passages 95 is machined to receive the other end of connector 96 the contour of which is identical with that entering counterbore 92 and fits against the inner end of counterbore 97 which is formed similarly to the inner end of counterbore 92.

The distributor head is clamped against the right hand end of member 72 by screws 98 sealing the joints between the connector 96 and the seats engaged thereby. As shown in FIG. 5, the right hand end of the passage 95 which is axially aligned with passage 75 is fitted with a connection, generally indicated at 99, that connects a tube 100 to the manifold, and tube 100 is connected at its other end to an instrument, such as a gauge to be tested (and not shown). The connection 99 is mounted in a counterbore 101 at the right hand end of axial passage 95. Counterbore 101 and counterbores at the outer ends of the other pasages each present frusto-conical sealing surfaces of the type previously described, but instead of clamping means being provided to hold the connector surfaces against the frusto-conical seats 103 of the counterbores, the counterbores are shown threaded and the connector 99 as being threaded and screwed into counterbore 101 to force the conical inner end into fluid tight engagement with the frusto-conical seat 103 of counterbore 101. The passages 95 not in use are shown as fitted with solid plugs, generally indicated at 104, the inner ends of which are provided with conical projections 105 engaging with frusto-conical seats 106 leading from the counter bores to the passages.

To insure a perfect fit of the conical surfaces of the connector 99 and plugs 104 with the seats 103 and 106, it is preferred to construct the connector and plugs as shown in FIG. 10. It will be noted that the conical inner end 107 of the connector 99 is formed on a drilled spindle 107' which is screw threaded at its inner end. A threaded sleeve 108 is screwed onto the threaded portion of the spindle, leaving the conical end of the spindle projecting therefrom. A nut 109 with the threads formed on a projecting counterbored skirt is fitted over the sleeve, the shoulder 110 of the nut 109 engaging with the end of the sleeve and operating when the nut is screwed into the counterbore 101 to force the conical end into pressure tight engagement with the seat 103.

The plugs 104 are similarly formed with a solid center part 111 engaged by a counterbored nut 112. The described construction enables a length of pipe welded to the drilled spindle to be used as a high pressure manifold to which the gauges or other high pressure fittings to be tested may be connected in any suitable manner.

A pressure gauge 113 is mounted at the upper end of a cylindrical fitting 114 drilled with an axial passage 115 and a transverse passage 116 intersecting said axial passage and which is aligned with passage 74 in distributor member 72.

Cylindrical fitting 114 is mounted in a gauge carrying head 117 bored to receive the fitting and provided with a set screw 118 by which the fitting 114 may be held in adjusted position. The prolongation of passage 74 in member 72 beyond its intersection with passage 75 therein is counterbored to receive a drilled connector 119 which may be identical in construction to connector 96 in parts 73 and 94, as previously described. Passage 116 in fitting 114 is also counterbored to receive the outer end of connector 119.

Studs 120 mounted passing through bores in member 117 and ending in tapped or screw threaded holes in member 73 hold the carrying head against member 73 and clamp the connector in metal to metal sealing relation around the passage 75 in part 73 and passage 116 in mounting head 117.

The lower end of axial passage 115 may be closed in any suitable way, for instance, by a threaded nut 121 with an associated center part 121' in the same manner as the nut 112 and associated center part 111.

The operation of the plunger 28 may be effected by manually operated mechanical means to obtain a mechanical advantage or multiplication of power applied to the device. A simple lever system is shown by the use of which pressures to 100,000 pounds per square inch (p.s.i.) may be set up in the manifold 100.

Referring to FIGS. 2 and 3 a lever handle 122 is shown which may be a length of thick walled steel tube. A second length (not shown) may be carried nested within the length of tube and partly withdrawn to extend the length of the handle if required.

Tubular handle 122 is fitted on the cylindrical extension 123 of a lever mounting member of yoke form 124, the flattened upper end 29 of plunger 28 being pivotally connected to member 124 by removable headed pin 126 passed through aligned holes in the plunger and arms of member 124.

Member 124 is pivotally mounted on frame 13 by removable headed pin 127 which may be passed through aligned holes 128 (FIG. 2) in the side plates of frame 13 and corresponding holes in member 124. Pin 126 may alternatively be passed through holes 129 in frame 13 and corresponding hole 130 in member 124 which affords a longer stroke of the lever with a reduction of the mechanical advantage of the lever.

Obvious other suitable mechanism may be utilized to apply reciprocatory force to the plunger 28.

*Operation*

The novel feature of my invention includes the use of a very small volume of hydraulic fluid put under pressure in the device. Attention is directed to the small diameter of the cylinder bore 27 and of piston 65, and also to the much smaller diameter of the passages for the fluid under pressure throughout the device. The consequent small diameter of the ball check valves 46 and 83 used to trap the pressure fluid in the passages results in minimum inertia of the ball and ball seat.

Attention is also directed to the absence of washers or sealing rings, although for ease in fabrication the device is formed as an assembly of separate parts. The metal to metal contact under heavy pressure eliminates any leakage of hydraulic fluid at any of the numerous junctions between separate parts. The connector means utilized are readily fabricated as bodies of revolution to the fine tolerances required at the ends thereof to ensure perfect engagement of the abutting surfaces in testing high pressure gauges for accuracy in reading, or to calibrate them against a master gauge mounted on the distributor member. It is particularly to be noted that wherever two body components are connected by one of these connectors, the adjacent faces of the bodies are held spaced from each other; said spaces being open to atmosphere. Thus there are no pockets in which escaping fluid may be trapped to build up unwanted and possibly dangerous pressure accumulations. Moreover, any leak occuring at such joints is readily detected. Also, to insure alignment with the engaged seats, the bodies of these connectors are about .015"-.020" less in diameter than the recesses into which they extend.

To prepare the pump for initial operation, the reservoir is provided with a supply of hydraulic fluid. Pins 126 and 127 are removed and the operating lever 124 is removed and the piston is either removed or elevated until the end thereof is in the recess 30. The valves 17' and 18' are opened as is also the bleed valve 55 which allows fluid to rise in passage 53 and thence flow into the recess 30 and down into the cylinder expelling the air therefrom. The piston and lever are replaced and a few strokes will expel all air into the top of the reservoir. The vent valve 55 is then closed and the pump is ready for service.

Assuming that the high pressure valve to be tested or calibrated, or the hydraulic component to be tested to destruction to ascertain exactly what safety factor the component had, is connected to the manifold tube 100 (FIG. 5) that the passages in the device are filled with fluid at reservoir pressure, and that the piston 65 is in maximum inward position. The operator then raises the free end of lever 122 thus raising piston 65, whereupon, fluid at low or atmospheric pressure will follow the piston upward on the suction stroke, but when the operator bears down on the lever, the ball 46 of inlet valve 36 will immediately drop onto its seat and hydraulic fluid will be forced through valve 83 into passage 75 of the distributor. Since needle valve 90 will have been screwed into closed position, the fluid will be forced into the gauge or other apparatus to be tested, the pressure resulting from each power stroke of the pumping unit being registered on the permanently installed gauge 113. Further, by removing the operating lever 24 and the pivot pin 64, the entire pump unit can be removed for inspection or repair or for quick replacement with another pump unit having the same or a different diameter bore and a complementary piston being interchangeable on the pin 126 to accommodate the cylinder bore and thus adapt the pump to other pressure ranges.

It will be noted that plunger 28 is guided for accurate straight line movement by sliding in the bore 26 in block 21. Any slight axial misalignment between the plunger 28 and the piston 65 is taken up by the diaphragm connection between the plunger and piston. The piston is supported for most of its length and any leakage of fluid past the piston is trapped in the recess 30 and is returned by gravity through passage 53 to the supply.

To lower the pressure in the device after use, and before disconnecting it from its load, the needle valve 89 is slacked back, allowing hydraulic fluid to flow through return hose 18 to the reservoir 14.

By providing connectors 119 and 96 in the form of ball check valves similar to valves 76, it is obvious that pressure may be held in the device, suitable pressure release means being provided for the permanently installed pressure gauge, for instance a needle valve.

Heretofore, pressure pumps usually had a range of around 30,000 p.s.i., but pumps have been constructed whereby with the use of an intensifier higher pressures have been accomplished, however, such use of an intensifier made the device very bulky, and costly. Also, such devices used heretofore were dangerous because of the likelihood of air becoming trapped therein, and high safety precautions had to be taken.

With my novel construction, I have been able to construct a pressure pump whereby I have been able to obtain pressures as high as 100,000 p.s.i., and which pump is simple in construction and safe to a very high degree, and the requirement of using an intensifier is eliminated.

I have discovered that the use of small ports or passageways eliminates the dangers that might result if a large diameter or body of fluid was subjected to pressures of the order of 100,000 p.s.i. and further, by the use of the said small ports and passageways no large body of air can collect in such passageways and cause explosion and damage; and as I compress only a very small volume of fluid, such as oil, even under 100,000 p.s.i. cannot cause any damage, nor is it dangerous, when hydraulic components are tested to destruction.

The device is particularly adaptable for use in testing valves, fittings, manifolds to destruction to ascertain what safety factor such devices have, and also to calibrate gauges up to 100,000 p.s.i. It will be apparent that any hydraulic component may be tested to destruction, if such occurs when subjected to a pressure of 100,000 p.s.i. obtainable by my novel device or pump.

It will also be apparent to those skilled in the art, that I may connect the distributor head 94 direct to the pump structure 15 in lieu of the member 72, if so desired.

It will also be noted that the piston block and the piston are floatingly mounted by reason of the pivotal mounting of the piston block on stud 64, and the piston is also so mounted on the diaphragm 68, and thereby any binding of the parts is eliminated during pressurizing operations.

A preferred embodiment of the invention has been specifically described and shown by way of illustration and example, but not as limitative of the scope of the invention, since modifications may be made in the described embodiment by those skilled in the art without departing from the scope of the invention as defined by the appended claims.

I claim:

1. A device for producing high hydraulic pressure comprising in combination, a frame, a pump unit mounted on said frame and including a cylinder having an inlet and an outlet, a piston means reciprocable in said cylinder and lever means for reciprocating said piston means, a fluid inlet check valve in said inlet, a high pressure fluid distributor component mounted on said unit, an outlet check valve unit having a fluid passage therethrough and a spring biased valve normally closing said passage; said check valve being interposed between said outlet and said distributor component and effective to afford fluid flow therethrough only to said distributor component, a pressure relief valve mounted in said distributor component, each of said valves having a metal valve seat and a relatively moving metal valve element, said distributor component having a plurality of passages therein connected at one end to a passage in said distributor component communicating with said fluid passage in said outlet check valve and terminating at their other ends in screw threaded openings in the surface of said distributor component affording connection for conducting high pressure fluid to hydraulically operated apparatus, separate means for selectively closing such of said openings as are not required for a particular usage, each of said closing means effecting metal to metal sealing of said openings and each of said closing means comprising a non-rotative plug element and a screw threaded element engaging the threads of the opening and an end surface of said plug element to cause said plug element to engage and seal the opening engaged thereby, and other means effective to clamp said distributor component and said pump unit outlet to opposite ends of said outlet check valve unit to establish fluid flow therebetween through said passage in said outlet valve unit and simultaneously effect fluid sealing relation at the junctures thereof.

2. A device as set forth in claim 1 which includes a fluid supply reservoir mounted on said frame and connected to said pump unit both upstream of said inlet valve and downstream of said pressure relief valve, and in which said pump unit and said lever are separately mounted on said frame for oscillating movement about parallel axis and in which said connections between said reservoir and said pump unit include flexible conduit means to accommodate movement of said pump unit about the pivotaly connection thereof to said frame.

3. A device as set forth in claim 1 and in which said piston means includes a plunger having a cylindrical recess in one end thereof; guide means rigidly connected to the cylinder and effective to guid said plunger for reciprocating movement in the axial line of said cylinder; a small diameter piston reciprocable in said cylinder and substantially axially aligned with said plunger having one end abutting said recessed end of said plunger; a circular diaphragm disposed in said recess in said plunger; a peripheral abutment mounted in the wall of said recess and engaging the outer edge of said diaphragm at the side thereof adjacent said cylinder; and a peripheral abutment mounted on the opposite end of the piston abutting the upper surface of said diaphragm.

4. A device for producing high hydraulic pressure comprising: a frame; a reciprocating piston and a cylinder block having a cylinder in which said piston is reciprocable mounted on said frame; operating means to effect reciprocation of said piston; an inlet passage in said block terminating at said cylinder and an inlet check valve unit having a ball valve element mounted in said inlet passage and including a valve seat body having a metal seat sealable by said ball; said valve body having a frusto-conical face seating on a mating frusto-conical seat at the outer end of said inlet passage; means clamping said valve seat body in position; a high pressure fluid distributor component mounted on said cylinder block; an outlet passage in said block leading high pressure fluid from the cylinder and terminating in a frusto-conical recess, and passages in said distributor component for leading high pressure fluid to hydraulically operated elements, one of said passages being axially aligned with the passage leading high pressure fluid from said cylinder and terminating in a frustro-conical recess; a connecting member provided with a passage aligned both with the outlet passage of said cylinder and with said one passage in said distributor component; said connecting member being provided with frusto-conical end surfaces disposed in coaxial relation to the ends of the passage therethrough and engaging mating, frusto-conical seating surfaces in said ends of the said passages; and means disposed exteriorly of said passages effective to clamp the distributor component against the cylinder block to effect liquid sealing contact between said frusto-conical ends and said recess engaged thereby.

5. A device as set forth in claim 4 and in which a metal ball check valve is mounted on a metal valve seat in said connecting member affording a metal to metal seal between the ball and its seat operative to prevent return of high pressure liquid from said distributor component to said cylinder.

6. A device as set forth in claim 4 including a hydraulic fluid reservoir mounted on said frame; an inlet port at the outer end of said inlet passage, a conduit connecting the reservoir to said inlet port; a pressure relief needle valve mounted in said distributor unit; and a conduit connecting said pressure relief valve to said reservoir.

7. A device as set forth in claim 6 which includes a passage extending through said cylinder block from the inlet port in the wall of the cylinder block toward the opposite end of the cylinder; a manually operable vent valve controlling fluid flow from said passage; a guide block mounted on said cylinder block and engaging the portion of said piston extending out of the cylinder block, there being a space provided between the adjacent ends of said guide block and said cylinder block and a passage connecting said space to the passage extending from said inlet port to said vent valve.

References Cited in the file of this patent

UNITED STATES PATENTS

| | | |
|---|---|---|
| 604,579 | Gass et al. | May 24, 1898 |
| 2,841,092 | Whiteman | July 1, 1958 |